June 19, 1951
E. W. ANDREWS
2,557,528
METHOD AND APPARATUS FOR EFFECTING CONTINUOUS SULFURIC ACID
DIGESTION OF TITANIFEROUS MATERIAL
Filed April 6, 1949
3 Sheets-Sheet 1
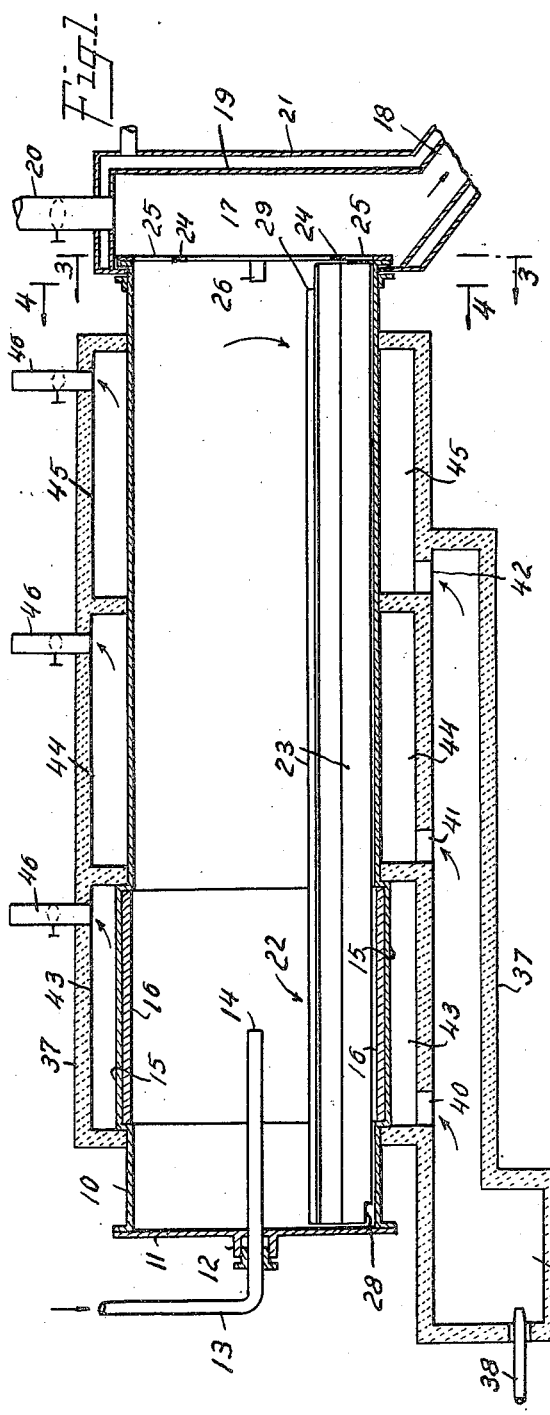
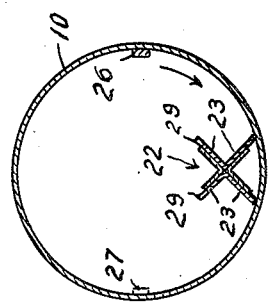
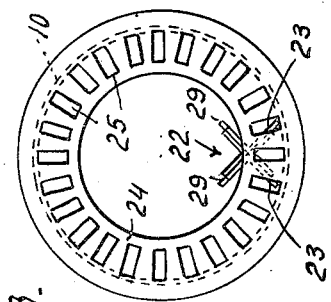
INVENTOR.
EARL W. ANDREWS
BY
ATTORNEYS June 19, 1951 E. W. ANDREWS 2,557,528
METHOD AND APPARATUS FOR EFFECTING CONTINUOUS SULFURIC ACID
DIGESTION OF TITANIFEROUS MATERIAL
Filed April 6, 1949 3 Sheets-Sheet 2

INVENTOR.
EARL W. ANDREWS
BY
ATTORNEYS

June 19, 1951

E. W. ANDREWS 2,557,528

METHOD AND APPARATUS FOR EFFECTING CONTINUOUS SULFURIC ACID DIGESTION OF TITANIFEROUS MATERIAL

Filed April 6, 1949

INVENTOR.
EARL W. ANDREWS
BY
Pennie, Edmonds, Morton & Barrows
ATTORNEYS

Patented June 19, 1951

2,557,528

UNITED STATES PATENT OFFICE 2,557,528

METHOD AND APPARATUS FOR EFFECTING CONTINUOUS SULFURIC ACID DIGESTION OF TITANIFEROUS MATERIAL

Earl W. Andrews, Slatington, Pa., assignor to The New Jersey Zinc Company, New York, N. Y., a corporation of New Jersey Application April 6, 1949, Serial No. 85,756

5 Claims. (Cl. 23—117)

This invention relates to the digestion of titaniferous materials and, more particularly, to a method of and apparatus for effecting continuous sulfuric acid digestion of titaniferous materials.

In the production of titanium dioxide pigment, titaniferous material such as iron-titanium ores and titanium-bearing slags is digested with concentrated sulfuric acid, the resulting titanium sulfate is recovered from the acid-treated product by leaching with water, and titanium dioxide is precipitated from the resulting titanium sulfate solution by hydrolysis. The digestion stage is generally carried out on a commercial scale by a batch operation such as that described in the United States patent to Washburn, No. 1,889,027. In such a batch operation, the titaniferous material is mixed with concentrated sulfuric acid and the resulting slurry is charged to a reaction vessel. Superheated steam is blown into the mass in order to raise its temperature to a value closely approximating that at which the sulfuric acid reacts with the titaniferous material. A small amount of water is then introduced into a portion of the heated mass to provide further local heating by dilution of the concentrated acid, and this local heating is sufficient to initiate the reaction between the acid and the titanium. The exothermic heat of reaction causes the initially local reaction to spread rapidly throughout the mass and results in the generation of sufficient heat to volatilize a large proportion of the water contained in the reaction mass. The product obtained at the end of the violent reaction period comprises a hard mass containing a major portion of the original titanium content in the form of titianium sulfate. It is conventional practice to follow the foregoing type of digestion procedure with a "baking" or "curing" treatment wherein the reaction product is maintained at an elevated temperature for a period of time sufficient to permit more of the titaniferous material to be converted to titanium sulfate.

Although the batch digestion of titaniferous material has been developed to the point where a large quantity of titaniferous material may be digested in this manner, it is generally recognized that it would be advantageous to carry out the digestion in a continuous operation. Considerable thought and effort have been devoted to the problem of continuous digestion of titaniferous material. The principal difficulties encountered in such a continuous operation are those resulting from the physical conditions prevailing in the reaction mass. During the course of the reaction between the titaniferous material and the acid, the consistency of the reaction mass ranges from that of a fluid slurry through subsequent states comprising a thickened slurry, then a gummy and dough-like mass, and finally, at the end of the violent digestion reaction, a hard solid. When a slurry of the reactants is introduced into a rotating kiln or the like for the purpose of effecting reaction therein and of discharging a relatively solid reaction product therefrom, the plastic and dough-like stages through which the reaction mass passes tend to cause the mass to ball-up and set in the form of a hard unmanageable mass of considerable volume. Any rolling device within the kiln is disadvantageous because it flattens the plastic mass against the interior surface of the kiln where it sets as a hard cake. The provision of a conventional scraper blade or the like within the kiln has been found to be effective in preventing the reaction mass from setting in the form of a cake on the inner surface of the kiln, but such a device has also been found to promote the balling-up of the charge to such an extent that the process becomes a batch operation rather than a continuous operation.

I have now found that titaniferous material can be digested with sulfuric acid in a continuous operation in a rotating kiln or the like provided that the interior surface of the kiln to which the titaniferous material and acid are charged is not only scraped to remove the plastic cake therefrom before it sets but the solidifying and solid reaction mass is maintained in a disintegrated condition. When these conditions are maintained throughout the main digestion period, I have found that the digestion is capable of being carried out in a continuous operation of considerably greater capacity and economy than the batch operation now generally being used.

The method of effecting continuous digestion of titaniferous material with sulfuric acid in accordance with my present invention comprises charging reacting proportions of the titaniferous material and acid into one portion of the interior of a rotatable and substantially horizontally disposed cylindrical vessel which contains a rigid elongated member provided longitudinally thereof with projecting fins. The finned member is substantially axially aligned within and is supported freely on the lower interior surface of the vessel so as to slide and thereby scrape the interior surface of the vessel as the latter is rotated. As the vessel is rotated, the finned member is also intermittently caused to be carried upwardly at irregular intervals on the ascending interior surface of the rotating vessel to such an unstable position as to cause the finned member to tumble back toward the lower interior portion of the vessel. The resulting scraping and tumbling action of the finned member serves to maintain the solidifying and solid charge within the vessel in substantially disintegrated condition. The charge within the vessel is maintained at approximately the reaction temperature between the titaniferous material and acid, and the reaction product is discharged in a substantially dry state from an end portion of the vessel.

The apparatus for effecting continuous digestion in accordance with my invention comprises a rotatable and substantially horizontally disposed cylindrical vessel having a rigid elongated member positioned therewithin in substantially axial alignment therewith. The elongated member, which is supported freely on the lower interior surface of the vessel, is provided longitudinally thereof with at least three projecting fins adapted to make self-supporting contact with the interior surface of the vessel. The interior surface of the vessel adjacent each end of the finned member is provided with at least two projecting members circumferentially displaced from one another within the vessel. At each end of the finned member, at least two adjacent fins, but less than all of the fins, are provided with cut-out portions adapted to clear the projections on the interior surface of the vessel as the vessel is rotated. The cut-out portions at the two ends of the finned member are so staggered that at least one of the fins in contact with the interior surface of the vessel is provided with a cut-out portion at only one end thereof so that at least once every complete revolution of the rotating vessel the finned member is tumbled over therewithin. Means are provided for rotating the vessel, for charging the titaniferous material and acid to the interior of the vessel, and for discharging the reaction product from an end portion of the vessel.

These and other novel features of the invention will be more readily understood by reference to the accompanying drawings in which:

Fig. 1 is a sectional elevation of the continuous digesting apparauts of the invention;

Fig. 3 is a sectional view taken along line 3—3 in Fig. 1;

Fig. 4 is a sectional view taken along line 4—4 in Fig. 1; and

Figure 2:
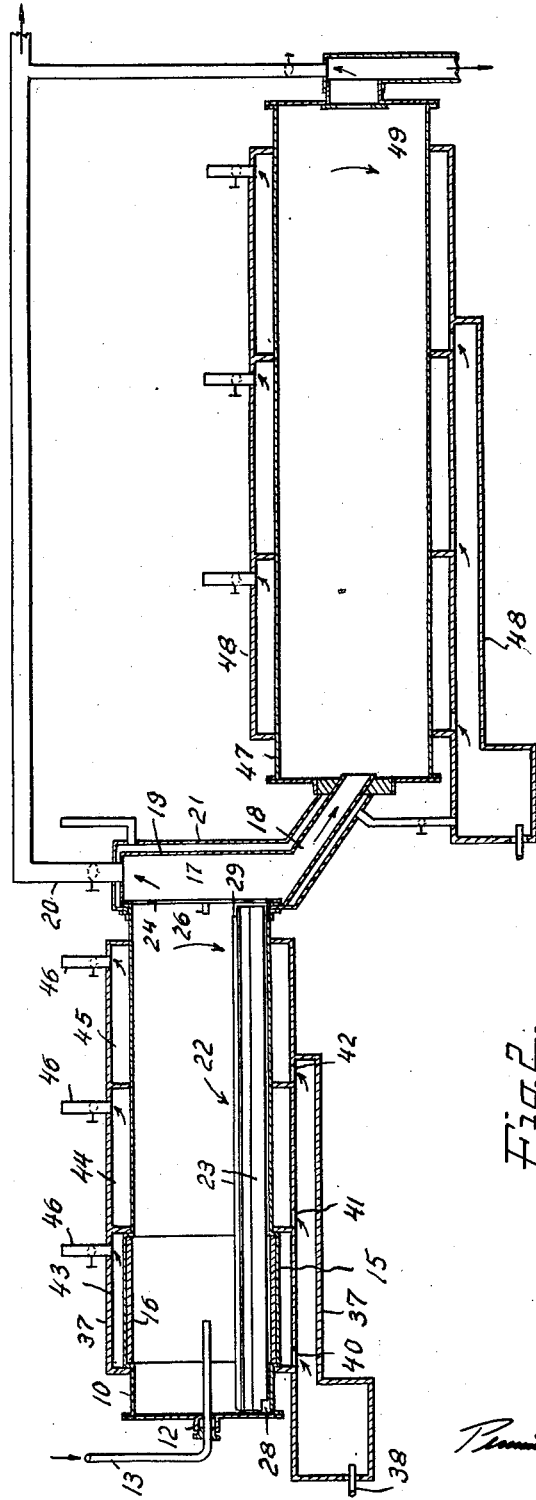
Fig. 2 is a sectional elevation of the continuous digesting apparatus shown in Fig. 1 communicating with a continuous baking apparatus for effecting substantially complete digestion of titaniferous material.

As shown in Fig. 1, the continuous digester of the present invention includes a cylindrical vessel or kiln 10 horizontally mounted for rotation by conventional driving means. The charging end 11 of the kiln is closed except for a gland 12 to permit entry of a charge line 13 into the interior of the kiln. That portion of the kiln in the vicinity of the discharge end 14 of the charge pipe is provided with a recessed portion 15 within which there is positioned a corrosion-resistant or expendable liner 16. Thus, the liner may comprise acid-resistant material such as brick, or it may comprise an expendable liner such as cast iron or the like. In either event, the liner 16 need extend only throughout that portion of the kiln in the vicinity of the discharge end 14 of the feed line within which the reaction mass remains in the form of a slurry. In other portions of the kiln, wherein the reaction products are either in a pasty or relatively solid form, the corrosiveness of the reaction mass is so negligible as not to require special lining. The reaction product is discharged from the other open end 17 of the kiln whence it is delivered to a discharge hopper 18. The open end of the kiln is enclosed in a hood 19 provided with a gas stack 20 through which the acid fumes and other vapors emanating from the reaction zone within the kiln are withdrawn and treated for removal of corrosive constituents in the usual manner. The discharge hopper 18 and the hood 19 are provided with a heating jacket 21 in order to prevent condensation of corrosive acidic vapors within the hopper and hood.

Within the interior of the rotating kiln 10, as shown in Figs. 1 and 4, there is provided a rigid finned member or rail 22 which is supported freely on the lower interior surface of the kiln and therefore in substantially axial alignment therewith. The finned member is provided longitudinally thereof with at least three projecting fins 23 of sufficient depth as to provide self-support for the elongated member within the interior of the vessel. Inasmuch as the finned member rests freely on the lower interior surface of the rotatable kiln, as shown clearly in Fig. 4, it will be apparent that as the kiln is rotated the finned member remains in the bottom of the kiln and therefore slides over the interior surface of the kiln passing thereunder. The finned member is held in a substantially fixed longitudinal position within the kiln by the closed end 11 of the kiln at one end and by an annular retaining ring 24 adjacent the other end of the finned member. The retaining ring, as shown in Fig. 3, is of sufficient width to retain the finned member 22 in its proper position within the rotating kiln and is further provided with suitable slots or openings 25 to permit discharge of the granular reaction product therethrough and into the discharge hopper 18.

I have found from experience that the sliding and scraping motion alone, which is provided by rotating the kiln containing the free finned member therewithin, causes the reaction mass in its plastic stage to ball-up and become completely uncontrollable within the vessel. On the other hand, I have found that this scraping action is essential in order to prevent the reaction product from solidifying in the form of a cake on the interior surface of the rotating kiln. In order to obtain the scraping action as well as a disintegrating or chopping action, I provide means for intermittently causing the finned member to be tumbled within the kiln at irregular intervals. Such tumbling is provided by intermittently carrying the finned member upwardly on the ascending interior surface of the rotating kiln until the position of the finned member becomes so unstable that it rotates about its own axis and tumbles downwardly again toward the bottom of the interior of the rotating kiln. This result is accomplished, as shown in Fig. 4, by providing a suitable projection such as a block 26 bolted to the interior surface of the kiln which, as it engages any one of the fins 23 of the finned member in contact with the bottom interior surface of the vessel, serves to carry the finned member upwardly on the ascending interior surface of the kiln. When the finned member is raised high enough to become unbalanced, it tumbles about its own axis so as to free itself from the block and slides downwardly again into the bottom interior portion of the rotating kiln.

It will be seen, accordingly, that the combined sliding and tumbling motion imparted to the finned member provides not only a scraping action on the interior surface of the kiln but also a chopping or chiseling action by the fins falling upon the balled-up reaction mass. As pointed out hereinbefore, the scraping action alone causes the reaction mass to ball-up. The chopping action provided by tumbling of the finned member is also inadequate because it produces merely a rippled cake-like deposit of the reaction product set firmly on the interior surface of the kiln. Both scraping and chopping actions are required. It will be appreciated, however, that the pattern of such scraping and chopping would, if repeated at regular intervals, leave unscraped that portion of the interior surface of the rotating kiln over which the finned member simply tumbled. The regularity of this pattern is broken up in accordance with my invention by providing a second projecting member 27 on the interior surface of the kiln circumferentially displaced from the first-mentioned projection 26. I have found it advantageous to position the first-mentioned projection 26 adjacent one end of the finned member and to position the other projection 27 adjacent the other end of the finned member. At least two adjacent fins at one end of the finned member are cut away as indicated at 28 so that they will clear the first-mentioned projection 26, and at least two adjacent fins at the other end of the finned member are similarly provided with cut-out portions 29 so positioned as to permit the second-mentioned projection 27 to pass by these fins without engaging them. By staggering the cut-out portions 28 and 29 adjacent the two ends of the finned member, it is possible for one of the projections to pass freely under the finned member without causing the latter to tumble whereupon the other projection will engage one of the fins at the other end of the finned member and cause the member to tumble. This arrangement of at least two circumferentially spaced projections on the interior surface of the kiln and staggered cutaway portions at the ends of the finned member creates an irregular scraping and tumbling pattern whereby the finned member sometimes provides simple scraping action in the region of each projection and sometimes provides a tumbling action in this same region. The irregularity of the pattern thus insures scraping action over the entire inner surface of the kiln at one time or another while also insuring the desired occasional chopping action provided by tumbling of the finned member. By staggering the cut-out portions 28 and 29 adjacent the two ends of the finned member in such manner that at least one of the two fins in contact with the interior surface of the vessel always presents a surface for engagement with at least one of the two projections, the finned member will be tumbled at least once every complete revolution of the kiln and on the average will be tumbled more frequently than this.

As pointed out hereinbefore, the projecting fins on the elongated member must be such as to make self-supporting contact with the interior surface of the vessel. Thus, the finned member rests on the extremities of its fins on the interior surface of the kiln so that the fins are always available for either the desired scraping action or for contact with the projections which produce the desired tumbling action.

Figure 5:
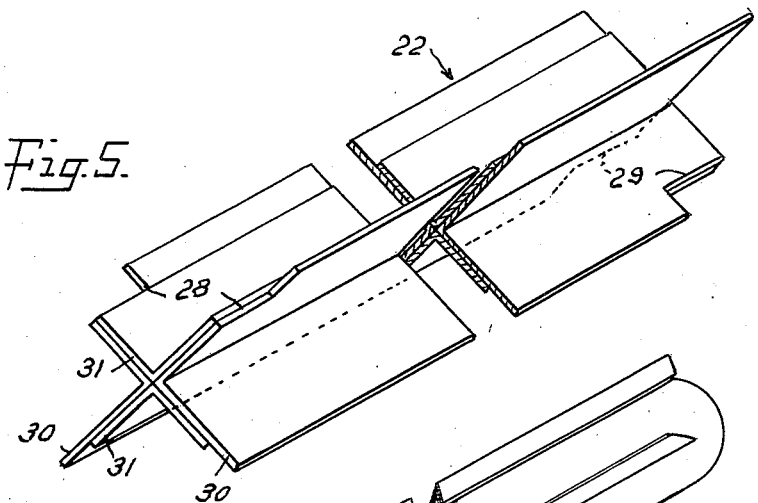
Figs. 5, 6 and 7 are perspective broken views of several forms of finned members useful in accordance with the invention.
Figure 6:
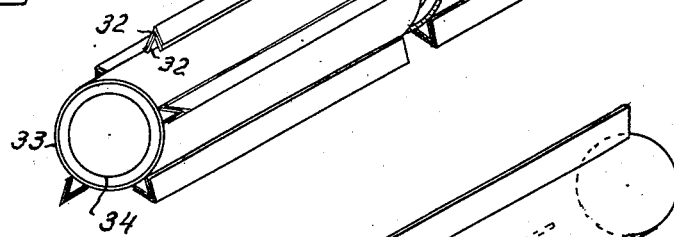
Figure 7:
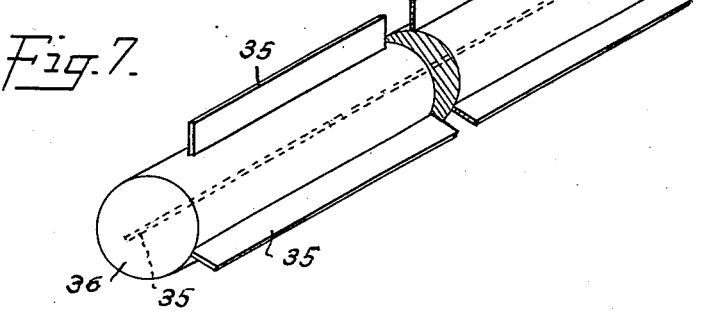

The finned member may be provided with any desired number of fins ranging from three upwardly. The fins may be provided in numerous different ways as shown in Figs. 5, 6 and 7. For example, a four-finned structure may be formed as shown in Fig. 5 by securing together two angle irons 30 abutting along the apexes of their angle. The two angle irons may be held in position by securing thereto two smaller angle irons 31. As shown in Fig. 6, each fin may be provided by a smaller angle iron 32 (or by several such angle irons stacked upon one another) secured face downwardly along the length of a pipe section 33. Such an arrangement is particularly satisfactory for making up a finned member having an odd number of fins. Additional weight may be provided by inserting a solid rod 34 within the pipe section 33. The finned members may also be constructed, as shown in Fig. 7, by welding straight fins 35 longitudinally along a solid rod 36 at circumferentially spaced intervals thereabout. The cut-out portions adjacent the ends of certain of the fins as described hereinbefore may be actual cut-ways portions, as shown in Fig. 5, or may be provided by terminating the fins short of the end of the finned member, as shown in Figs. 6 and 7.

The depth of the fins should be sufficient to provide the desired chopping action throughout the reaction mass, and this in turn is dependent upon the number of fins and the overall size of the member. In general I have found that particularly effective disintegration of the reaction mass is provided by finned members of such size with respect to the kiln that the finned member will fit into an imaginary hole having a diameter of at least about 1/5 and not more than about 1/2 the internal diameter of the kiln. If the effective diameter of the finned member is less than about 1/5 that of the kiln, the plastic reaction mass balls-up immediately behind the advancing scraping fins and does not get chopped as the finned member is tumbled. When the effective diameter of the finned member exceeds about 1/2 that of the kiln, the tumbling action is somewhat impeded and the chopping action of the fins of the tumbling member is not adequate to maintain the necessary disintegrated condition of the reaction mass.

The exterior of the rotating kiln 10 is enclosed in a suitable heating chamber 37, preferably compartmentized, provided with any appropriate heating means such as an oil or gas burner 38 or the like positioned in a combustion chamber 39. The flame from the burner is carried through ports 40, 41 and 42 into each of the compartments 43, 44 and 45, respectively, of the heating chamber. Exhaust gases are discharged through the stack connection 46. The hottest portion of the flame is directed into the heating compartment 43 surrounding the charging portion of the kiln in order to bring the reaction mass up to the desired reacting temperature as quickly as possible. In rotating kilns of relatively small size, the heating chamber serves to provide the heat required for effecting and maintaining the desired digestion reaction. In larger kilns, where a relatively large mass of reactants can be maintained, the exothermic heat of reaction may be such that the heat supplied to the heating chamber around the kiln need be only that required to prevent heat loss from the reaction mass. It will be understood, of course, that any other readily controllable heating means may be used such as steam, hot air or electrical space heaters.

I have found it advantageous to charge the slurry of reactants to the kiln a substantial distance inwardly beyond the closed end 11 thereof, as shown in Fig. 1. This manner of charging prevents accumulation of a plastic reaction mass adjacent the closed end of the kiln where it would tend to cause binding of the finned member 22, eliminates the necessity of applying heat to this extreme end of the kiln in order to initiate the reaction, and eliminates the necessity of extending the liner 16 into this extreme end of the kiln where the end of the finned member might possibly damage the liner when it is tumbled thereover. The advantages of charging the slurry of reactants well within the interior of the kiln can also be realized by charging the slurry to the central portion of the kiln and then discharging the reaction product from both ends of the kiln.

In operation of the continuous digester, a slurry of titaniferous material and concentrated sulfuric acid in conventional reacting proportions is delivered through the charge line 13 into the interior of the rotating kiln 10. The slurry is charged at such a rate as to maintain within the kiln 10 a mass of reacting material having an average or effective depth not appreciably greater than that of the fins of the finned member. The heating chamber 37 is maintained at a temperature such as to bring the slurry within the kiln quickly up to a reaction temperature of about 180–210° C., and preferably about 200° C. Prolonged heating at temperatures above about 210° C. should be avoided so as not to decompose the titanium sulfate formed by the reaction. Decomposition of the sulfate yields titanium dioxide in the form of rutile which resists further attack by the sulfuric acid.

The reaction mass, as it progressively works its way toward the discharge end of the kiln, first becomes sticky and pasty, then dough-like and finally relatively hard and dry. The plastic reaction mass serves as a dam to prevent the fluid slurry from flowing uninterruptedly toward the discharge end 17 of the kiln. Rotation of the kiln causes the finned member 22 to slide over the interior surface of the kiln adjacent the lower portion thereof. Each of the projections 26 and 27 intermittently pass under or engage the fins 23 of the finned member in contact with the interior surface of the kiln. When the projection slides freely past the two fins in contact with the kiln, the finned member maintains a sliding and scraping action, and when the projection engages one of the fins in contact with the surface of the kiln it carries the finned member part way up the ascending side of the kiln until the finned member becomes unbalanced and tumbles over. The finned member then slides back toward the lower portion of the kiln and resumes its scraping action. In the course of tumbling, the finned member chops or chisels its way into both the plastic and solid portions of the charge and thereby maintains the charge in a substantially disintegrated condition.

By maintaining a retention period of 5 to 15 minutes for the reaction mass passing through the rotating kiln, about 50–60% of the original titanium content of the titaniferous material is converted to the sulfate in the course of travel of the reaction mass through the kiln. Such travel is insured by the continuous charging of the reaction slurry to the kiln in spite of the horizontal position of the kiln. If desired, however, the kiln may be mounted in a somewhat tilted position to facilitate the passage of the reaction mass therethrough, particularly where a relatively short retention period is desired. The substantially dry reaction product discharged from the kiln 10 is delivered from the discharge hopper 18 to a second rotating kiln 47 similarly heated externally thereof by a heating chamber 48. The kiln 47 is rotated slowly to maintain the disintegrated reaction product therewithin in a state of motion. The relatively dry condition of the reaction product charged to the second kiln 47 obviates the necessity for any scraping or agitating means within this kiln. The size of the kiln 47 and the depth of the charge maintained therewithin by the adjustable dam 49 at the discharge end thereof are preferably such as to maintain a baking period of about 1½ to 2 hours at a temperature of about 190–200° C. If the titaniferous material being digested comprises titaniferous slag containing a relatively large amount of reduced titanium, air or air and steam may be introduced into the baking kiln in any suitable manner in order to promote oxidation of the reduced titanium as described in the United States applications of John H. Weikel, Serial No. 83,285, filed March 24, 1949, and Erwin L. Schneider, Serial No. 83,290, filed March 24, 1949. Such oxidation of reduced titanium is not required when the titaniferous material being digested comprises a titanium ore or the like which is substantially free of such "reduced" titanium compounds in which the titanium has a valence of less than four. The product discharged from the baking kiln contains generally in excess of 95% of the titanium content thereof in the form of titanium sulfate.

The following description of a specific form of apparatus in which the method of my invention was carried out will serve further to illustrate both the apparatus and the method. The digestion operation was carried out in a rotating kiln 13 feet long and having an inside diameter of 36 inches. Approximately 9 feet of the length of the kiln were enclosed in a three-chamber heating jacket. The finned rail within the kiln was 1 inch shorter than the kiln at each end in order to provide clearance at the ends of the kiln. The finned member had a structure such as that shown in Fig. 5 and was made up of two 6-inch angle irons secured together adjacent their opposing apexes by two 4-inch angle irons. The resulting structure provided a finned member having four 6-inch fins (and a resulting effective diameter of 12 inches) and weighed 765 pounds. The fins were provided with cut-out portions arranged as shown in Fig. 5.

The apparatus was used for digesting a titaniferous slag produced in accordance with the United States application of Peirce, Waring and Fetterolf, Serial No. 769,470, filed August 19, 1947, now Patent No. 2,476,453. The slag contained about 70% $TiO_2$, about 8% iron oxide (calculated as Fe), about 2% lime and the balance constituents principally of gangue origin. Although the slag and acid were charged in the form of a slurry in this specific example, it will be understood that the titaniferous material and acid may be separately introduced into the kiln. A charge slurry of the slag and sulfuric acid having a conventional acid-to-slag ratio of 1.5 was charged to the kiln, the acid being expressed as pure $H_2SO_4$ in determining this ratio although the acid was added in the form of 93% sulfuric acid. It will be noted that this acid strength is considerably lower than that required for conventional batch operation where higher acid concentration is necessary to provide, by its dilution, a large fraction of the heat required for initiating the digestion reaction. The slurry of slag and acid was charged at the rate of 30,700 pounds of slag per day, and the reaction product was discharged from the kiln at the rate of 75,300 pounds per day. The kiln was rotated at a speed of about 13 R. P. M. and provided a retention period of about 10 minutes for the passage of the reactants through the kiln. A temperature of 375° C. was maintained in the heating chamber surrounding the charging end of the kiln, and a temperature of about 300° C. prevailed in the other two heating chambers surrounding the remainder of the kiln. These heating chamber temperatures maintained a temperature of about 200° C. throughout the entire reaction mass within the kiln. The reaction product leaving the discharge end of the kiln was an essentially granular material the particles of which had an average diameter of about 1/4 inch. The discharge product contained very little fines and some large particles ranging up to about 1/2 to 3/4 inch in diameter. Approximately 59% of the titanium content of the slag was found to be converted to sulfate in the product discharged from the digestion kiln. This discharge product was charged directly to a similar kiln 12 feet long and 27 inches in internal diameter which was heated in a manner similar to the digesting kiln in order to maintain a baking temperature of about 200° C. in the granular product therewithin. Some of the combustion gases from the heating chamber surrounding the baking kiln were diverted to the heating jacket around the discharge hopper (as shown in Fig. 2) in order to prevent condensation within the hopper of corrosive acidic moisture. A bed of the product about 9 inches deep was maintained in the baking kiln, which was rotated at a speed of about 1 R. P. M., so as to provide a retention period of about 1½ to 2 hours. The product discharged from the second kiln contained about 95% of the original titanium content of the slag in the form of titanium sulfate.

It will be seen that the method and apparatus of my invention make it possible to digest titaniferous material with sulfuric acid in a continuous operation. This result is achieved by virtue of the scraping and disintegrating action provided within the continuous digester in accordance with the invention. The maintenance of a disintegrated condition throughout the solidifying and solid reaction mass in the digester assures uninterrupted passage of the reacting mass through the digester so that optimum reaction conditions can be obtained throughout. Such control of the main digestion operation, that is, of that portion of the digestion operation wherein the violent reaction takes place with concurrent transformation of the slurry-like mass to a relatively dry hard solid, makes it possible to complete the digestion to a commercially acceptable extent in a simple curing operation in a suitable vessel. Accordingly, my invention includes not only a novel continuous digestion method and apparatus but the embodiment thereof in a complete method and apparatus for effecting substantially complete digestion or attack of titaniferous material pre-eminently adapted for use in the production of titanium dioxide pigment.

I claim:

1. Apparatus for effecting continuous digestion of titaniferous material with sulfuric acid which comprises a rotatable and substantially horizontally disposed cylindrical vessel, a rigid elongated member positioned within the vessel in substantially axial alignment therewith and supported freely on the lower interior surface thereof, said elongated member being provided longitudinally thereof with at least three projecting fins adapted to make self-supporting contact with the interior surface of the vessel, at least one projecting member positioned on the interior surface of the vessel adjacent each end of the finned member with the projecting members circumferentially displaced from one another within the vessel, at least two adjacent fins but less than all of the fins at each end of the finned member being provided with cut-out portions adapted to clear the projections on the interior surface of the vessel as the vessel is rotated, the cut-out portions at the two ends of the finned member being so staggered that at least one of the fins in contact with the interior surface of the vessel is provided with a cut-out portion at only one end thereof, means for rotating the vessel, means for charging the titaniferous material and acid into the interior of the vessel, means for maintaining the titaniferous material and acid within the vessel at a reacting temperature, and means for discharging the reaction product of said material and acid from an end portion of the vessel.

2. Apparatus for effecting continuous digestion of titaniferous material with sulfuric acid which comprises a rotatable and substantially horizontally disposed cylindrical vessel, a rigid elongated member positioned within the vessel in substantially axial alignment therewith and supported freely on the lower interior surface thereof, said elongated member being provided longitudinally thereof with four radially spaced projecting fins adapted to make self-supporting contact with the interior surface of the vessel, a projecting member positioned on the interior surface of the vessel adjacent each end of the finned member with the projecting members circumferentially displaced from one another within the vessel, at least two adjacent fins but less than all of the fins at each end of the finned member being provided with cut-out portions adapted to clear the projections on the interior surface of the vessel as the vessel is rotated, the cut-out portions at the two ends of the finned member being so staggered that at least one of the fins in contact with the interior surface of the vessel is provided with a cut-out portion at only one end thereof, means for rotating the vessel, means for charging the titaniferous material and acid into the interior of the vessel, means for maintaining the titaniferous material and acid within the vessel at a reacting temperature, and means for discharging the reaction product of said material and acid from an end portion of the vessel.

3. Apparatus for effecting continuous digestion of titaniferous material with sulfuric acid which comprises 1) a rotatable and substantially horizontally disposed cylindrical vessel, a rigid elongated member positioned within the vessel in substantially axial alignment therewith and supported freely on the lower interior surface thereof, said elongated member being provided longitudinally thereof with at least three projecting fins adapted to make self-supporting contact with the interior surface of the vessel, at least one projecting member positioned on the interior surface of the vessel adjacent each end of the finned member with the projecting members circumferentially displaced from one another within the vessel, at least two adjacent fins but less than all of the fins at each end of the finned member being provided with cut-out portions adapted to clear the projections on the interior surface of the vessel as the vessel is rotated, the cut-out portions at the two ends of the finned member being so staggered that at least one of the fins in contact with the interior surface of the vessel is provided with a cut-out portion at only one end thereof, means for rotating the vessel, means for charging the titaniferous material and acid into the interior of the vessel, means for maintaining the titaniferous material and acid within the vessel at a reacting temperature, and means for discharging the reaction product of said material and acid from an end portion of the vessel; and 2) a second rotatable and substantially horizontally disposed cylindrical vessel, means for delivering the discharged reaction product from the first-mentioned vessel to the second-mentioned vessel, and means for maintaining said reaction product within the second-mentioned vessel at said reacting temperature for a sufficient period of time to effect baking of the reaction product with resulting increase in the extent of conversion of the titaniferous material to titanium sulfate.

4. Apparatus adapted to maintain a mass of material in a substantially disintegrated condition while the mass is agitated as it progresses through a plastic stage wherein it tends to ball-up in massive form, said apparatus comprising a rotatable and substantially horizontally disposed cylindrical vessel, a rigid elongated member positioned within the vessel in substantially axial alignment therewith and supported freely on the lower interior surface thereof, said elongated member being provided longitudinally thereof with at least three projecting fins adapted to make self-supporting contact with the interior surface of the vessel, and at least one projecting member positioned on the interior surface of the vessel adjacent each end of the finned member with the projecting members circumferentially displaced from one another within the vessel, at least two adjacent fins but less than all of the fins at each end of the finned member being provided with cut-out portions adapted to clear the projections on the interior surface of the vessel as the vessel is rotated, the cut-out portions at the two ends of the finned member being so staggered that at least one of the fins in contact with the interior surface of the vessel is provided with a cut-out portion at only one end thereof, means for rotating the vessel, means for charging the material into the interior of the vessel, means for maintaining the material within the vessel at the desired temperature, and means for discharging the material in a substantially disintegrated condition from an end portion of the vessel.

5. In the digestion of titaniferous material with sulfuric acid at an elevated temperature wherein the digestion reaction proceeds with concomitant change in the physical state of the reaction mass from that of a fluid slurry through that of a plastic mass and ultimately to that of a substantially dry coherent solid mass of the digestion product, the improvement which comprises rendering the digestion capable of continuous operation wherein the titaniferous material and acid are substantially continuously charged to a digestion reaction zone and the digestion product is substantially continuously discharged from said zone in the form of a substantially dry disintegrated solid mass by progressively advancing reacting proportions of the charged titaniferous material and acid through the reaction zone, subjecting the resulting advancing mass to heating and agitation by contact with a revolving heated surface to which the plastic intermediate reaction mass tends to adhere, and alternately scraping and chopping the plastic intermediate reaction mass adhering to said surface by means of a sliding and tumbling element in such manner as to maintain the solidifying and solid reaction mass in a substantially disintegrated condition until it is discharged from the reaction zone.

EARL W. ANDREWS.

REFERENCES CITED

The following references are of record in the file of this patent:

UNITED STATES PATENTS

| Number | Name | Date |
|---|---|---|
| 1,309,211 | Marcy | July 8, 1919 |
| 1,504,670 | Blumenfeld | Aug. 12, 1924 |
| 1,525,790 | Bartley | Feb. 10, 1925 |
| 2,098,025 | Booge et al. | Nov. 2, 1937 |
| 2,098,054 | McBerty | Nov. 2, 1937 |
| 2,153,300 | Dahlen et al. | Apr. 4, 1939 |
| 2,290,113 | Bousquet | July 14, 1942 |

FOREIGN PATENTS

| Number | Country | Date |
|---|---|---|
| 78,078 | Austria | Sept. 10, 1919 |